United States Patent
Krieg et al.

(10) Patent No.: US 11,062,257 B2
(45) Date of Patent: Jul. 13, 2021

(54) SHIPPING MANAGEMENT SYSTEM WITH MULTI-CARRIER SUPPORT

(71) Applicant: Convey Inc., Austin, TX (US)

(72) Inventors: Carson Bennett Krieg, Austin, TX (US); Daniel James Bebout, Austin, TX (US); Jennifer Lynn Bebout, Austin, TX (US)

(73) Assignee: CONVEY INC., Austin, TX (US)

( * ) Notice: Subject to any disclaimer, the term of this patent is extended or adjusted under 35 U.S.C. 154(b) by 426 days.

(21) Appl. No.: 15/836,374

(22) Filed: Dec. 8, 2017

(65) Prior Publication Data

US 2018/0165642 A1   Jun. 14, 2018

Related U.S. Application Data

(60) Provisional application No. 62/432,517, filed on Dec. 9, 2016.

(51) Int. Cl.
| | |
|---|---|
| *G06Q 10/08* | (2012.01) |
| *G06F 3/0482* | (2013.01) |
| *G06F 9/451* | (2018.01) |
| *G06Q 50/28* | (2012.01) |
| *G06F 9/44* | (2018.01) |

(52) U.S. Cl.
CPC ..... *G06Q 10/08345* (2013.01); *G06F 3/0482* (2013.01); *G06F 9/44* (2013.01); *G06F 9/451* (2018.02); *G06Q 10/08* (2013.01); *G06Q 50/28* (2013.01)

(58) Field of Classification Search
CPC .. G06Q 10/08; G06Q 10/083; G06Q 10/0834; G06Q 10/08345
See application file for complete search history.

(56) References Cited

U.S. PATENT DOCUMENTS 9,842,308 B1 * 12/2017 Biswas ............... G06Q 10/083
2002/0032573 A1   3/2002 Williams et al.
2005/0278063 A1  12/2005 Hersh et al.
(Continued)

OTHER PUBLICATIONS

Cave, P. (2007). Freight transporation between the united kingdom and western russia : Modal choice (Order No. U584179). Available from ProQuest Dissertations and Theses Professional. (1368795875). Retrieved from https://dialog.proquest.com/professional/docview/1368795875?accountid=131444 (Year: 2007).*
(Continued)

*Primary Examiner* — Kevin H Flynn
*Assistant Examiner* — Michelle E Carey
(74) *Attorney, Agent, or Firm* — Sprinkle IP Law Group

(57) ABSTRACT

Systems, methods, and products for dynamically selecting carriers in a shipping management system are disclosed. In one embodiment, in response to a user requesting a new shipment, a shipping management system collects shipping information from a plurality of carriers. The system provides the user with a choice of carriers to ship the new shipment based on selection rules. In response to the choice of carriers provided to the user, the user can select one of the carriers to execute the new shipment. The shipping management system can send a signal to the computer system of the chosen carrier to execute the new shipment.

20 Claims, 8 Drawing Sheets

(56) References Cited

U.S. PATENT DOCUMENTS

| | | | |
|---|---|---|---|
| 2008/0031277 A1* | 2/2008 | Walter | H04L 41/12 370/469 |
| 2010/0235303 A1 | 9/2010 | Lynch | |
| 2015/0006428 A1* | 1/2015 | Miller | G06Q 10/0835 705/336 |
| 2015/0120602 A1* | 4/2015 | Huffman | G06Q 10/0836 705/339 |
| 2015/0363843 A1 | 12/2015 | Loppatto et al. | |
| 2016/0210591 A1 | 7/2016 | Lafrance | |
| 2016/0239788 A1 | 8/2016 | Hanks | |
| 2016/0335593 A1* | 11/2016 | Clarke | G06Q 10/0833 |

OTHER PUBLICATIONS

International Preliminary Report on Patentability (IPRP) issued for International Patent Application No. PCT/US17/65348, dated Jun. 20, 2019, 6 pages.
International Search Report and Written Opinion for International Patent Application No. PCT/US17/65348, dated Feb. 13, 2018, 7 pgs.
European Search Report issued for European Patent Application No. 17877983.0, dated Jul. 31, 2020, 10 pages.
Office Action for Canadian Patent Application No. 3045489, dated Jan. 26, 2021, 5 pgs.

* cited by examiner

| CARRIER PERFORMANCE | | | | | | |
|---|---|---|---|---|---|---|
| Carrier | Mode | OTP | DBE | LOH(mi) | Cost/lb/mi | In Transit |
| Carrier 1 | LTL | 83.6% | 49% | 1423 | $2.02 | 485 |
| Carrier 2 | LTL | 80.5% | 67% | 1414 | $2.39 | 335 |
| Carrier 3 | LTL | 85.5% | 75% | 464 | $2.82 | 271 |
| Carrier 4 | LTL | 73.7% | 69% | 1637 | $2.46 | 228 |
| Carrier 5 | LTL | 89.6% | 60% | 141 | $0.62 | 3 |

FIG. 2

Schedule Pickup app.getconvey.com — John Smith

| 1 | 2 | 3 | 4 |
|---|---|---|---|
| Provide Shipment Details | Choose a Carrier | Review Details | Pickup Scheduled |

Role

I Am The*: Shipper

Shipper

- Origin*: Comp. 1 (12500 Jefferson Ave) 12345
- Contact Name*: John Smith
- Phone*: (800) 555-5555  98
- Email*: jsmith@...

Consignee

- Address Type: BUSINESS | RESIDENTIAL
- Company Name*: Company 2 (Search or type a new name)
- Address*: 320 Mill Rd. / Street 2
- 12345
- Contact Name*: John Doe
- Phone*: (800) 555-5555  Ext

FIG. 4

| Schedule Pickup | | | | |
|---|---|---|---|---|
| 1 | 2 | 3 | 4 | |
| Provide Shipment Details | Choose a Carrier | Review Details | Pickup Scheduled | |
| Carrier | New/Used Liability | Transit Days | Est. Delivery | Net Charge |
| Carrier 4 | $5,000/$20 | 2 | Thu 11/3/16 | $106 SELECT → |
| Carrier 3 | $5,000/$20 | 1 | Wed 11/2/16 | $128 SELECT → |
| Carrier 1 | $3,220/$20 | 2 | Thu 11/3/16 | $143 SELECT → |
| Carrier 2 | $5,000/$20 | 2 | Thu 11/3/16 | $165 SELECT → |

✗ Carrier 5 is unable to calculate rate based on pickup and delivery locations

Shipment Exceptions

| BOL # | PRO # | Ref # | Shipper ZIP | Shipper Name | Pickup | Status | Est. Delivery | Consignee ZIP |
|---|---|---|---|---|---|---|---|---|
| 1077916 | 990934730 | | 33167 | Dropshipper X | 4/4/16 | | 4/11/16 | 95437 |
| 10805347573 | 990934750 | | 33167 | Dropshipper X | 4/21/16 | | 4/28/16 | 93282 |
| 8698808680 | 221369633 | | 33167 | Dropshipper X | 8/16/16 | | 8/18/16 | 08831 |
| 8688710369 | 76414275250 | | 94587 | Dropshipper Y | 3/14/16 | | 3/16/16 | 84722 |
| 868915223 | 153210234 | | 94587 | Dropshipper Y | 4/11/16 | | 4/14/16 | 84737 |
| 869056917 | 76414274720 | | 94587 | Dropshipper Y | 4/29/16 | | 5/6/16 | 02557 |
| 869328025 | 76414274790 | | 94587 | Dropshipper Y | 6/9/16 | | 6/16/16 | 28216 |
| 869363775 | 169701354 | | 94587 | Dropshipper Y | 6/14/16 | | 6/15/16 | 90018 |
| 8697673750 | 153440807 | | 94587 | Dropshipper Y | 8/10/16 | | 8/18/16 | 10013 |
| 8701141832 | 169701462 | | 94587 | Dropshipper Y | 10/14/16 | | 10/18/16 | 80221 |

Showing 1 to 10 of 1,749 entries

FIG. 7

Shipment Detail app.getconvey.com — John Smith

TRACKING/PRO: 169701462    REFRESH STATUS    DOWNLOAD BOL    DOWNLOAD LABEL    PRINT PAGE

SHIPPER
Ship Date
Fri 10/14/16

Dropshipper X
1285 Atlantic St
Union City, CA 94587

Origin Terminal
OAK (Oakland, CA)
San Lorenzo, CA

Carrier 3

Add Note

CONSIGNEE
Estimated Delivery
Tue 10/18/16

Destination Terminal
DVR (Denver, CO)
Aurora, CO

HISTORY    DETAILS    ANALYTICS

| 10/15/16 | SAT | 12:28 PM | ⚠ POTENTIAL MISSED PICKUP – CALL RL CARRIER 3 AT (555) 555-5555 TO CONFIRM A NEW PICKUP DATE |
| 10/13/16 | THU | 6:24 PM | PICKUP SCHEDULED VIA CONVEY |

FIG. 8

SHIPPING MANAGEMENT SYSTEM WITH MULTI-CARRIER SUPPORT

RELATED APPLICATIONS

This application claims a benefit of priority under 35 U.S.C. § 119 to U.S. Provisional Patent Application No. 62/432,517 filed Dec. 9, 2016, entitled "SHIPPING MANAGEMENT SYSTEM WITH MULTI-CARRIER SUPPORT", which is hereby fully incorporated by reference in its entirety.

TECHNICAL FIELD

The present disclosure relates generally to computer systems for managing shipment of goods. More particularly the present disclosure relates to online computer systems for dynamic carrier selection.

BACKGROUND

The shipment of goods between shippers and recipients is typically carried out by carriers that own assets (trucks, cars, cargo ships, airplanes, rail cars) and that are contracted by manufacturers and retailers of those goods. In general, shipments are divided into two modes: "parcel" and "freight." Parcels are generally small, individual shipments handled by common carriers. Individual shippers can drop off these shipments at numerous locations (or have the shipments picked up) at their convenience. Pricing is generally determined by dimensional and/or weight. Carriers typically limit parcel shipments to particular weight and/or dimensions (e.g., 150 lbs. and 165" in length plus girth).

A shipment that exceeds the parcel limits is typically categorized as freight. Freight may be further divided into freight modes such as Full Truckload (FTL), Partial Truckload, Less Than Truckload (LTL), Air Freight, Ocean Freight, Rail Freight and Intermodal Freight. Freight pricing is determined on a number of factors including mode, route distance, fuel costs, density and value (weight, length, height), stow-ability, handling, liability, freight class, etc. Freight shipments are generally arranged with a carrier. Arrangements may include how the freight is to be loaded, how long it will take in transport, specialized equipment required or other information to facilitate the delivery.

Conventionally, shippers maintain internal lists of the costs of shipping goods to various destinations by each carrier/mode that the shipper uses. When a package is ready to be shipped, the shipper simply selects the lowest cost carrier/mode for that shipment.

An organization that does a large amount of shipping may have a computer system that is tightly integrated with a carrier system to notify the carrier that a shipment is ready for pickup, print shipping labels, etc. However, conventional shipper systems, even if they can integrate with multiple carriers, are limited because they rely on users to input costs and then base carrier selection on those costs.

Moreover, prior systems do not adequately account for drop shippers. With drop shipping, a retailer does not keep goods in stock but instead relies on a manufacturer, another retailer, or a wholesaler to ship a product. When a drop shipper is used, the retailer's ordering system will transfer customer orders and shipment details to the drop shipper, ceding control of the shipment provisioning process to the drop shipper. The retailer's shipping system cannot effectively enforce the use of particular carriers or policies on the drop shipper.

SUMMARY OF THE DISCLOSURE

This disclosure is directed to systems, methods, and products for dynamically selecting carriers in a shipping management system. One particular embodiment is directed to a system for facilitating dynamic carrier selection having one or more computer systems coupled to a network and a data storage device. The system collects shipping information from a plurality of carriers using one or more ingest modules, in response to a user scheduling a new shipment. The system uses one or more normalization modules to normalize the collected shipping information from the plurality of carriers. The system applies one or more selection rules to the normalized collected shipping information to select a group from the plurality of carriers for presentation to the user. One of the selected carriers is chosen by the user or automatically by the system for execution of the new shipment. The system sends a signal to the computer system of the selected carrier to execute the shipment.

Numerous other embodiments are also possible.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features and wherein:

FIG. 2 depicts a diagrammatic representation of one embodiment of a scorecard illustrating various metrics for carriers/modes.

FIG. 4 depicts a schedule pickup menu for a dashboard provided by a shipping management system.

FIG. 5 depicts a dynamically generated web page in which carriers are presented to the user.

FIG. 6 depicts a web page in which the user can review the shipping order and finalize the order for shipment by the carrier that was user or automatically selected.

FIG. 7 depicts a shipping status view provided by a shipping management system.

FIG. 8 depicts a shipping details view provided by a shipping management system.

DETAILED DESCRIPTION

The invention and the various features and advantageous details thereof are explained more fully with reference to the nonlimiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this disclosure.

Embodiments described herein provide a shipping management system that integrates with a variety of carrier systems, analyzes carrier tracking data and other data and allows selection of carriers on an individual shipment basis based on dynamic factors. The shipping management system can facilitate shipping across shippers for an account holder and enforce carrier selection policies for the account holder.

Figure 1:
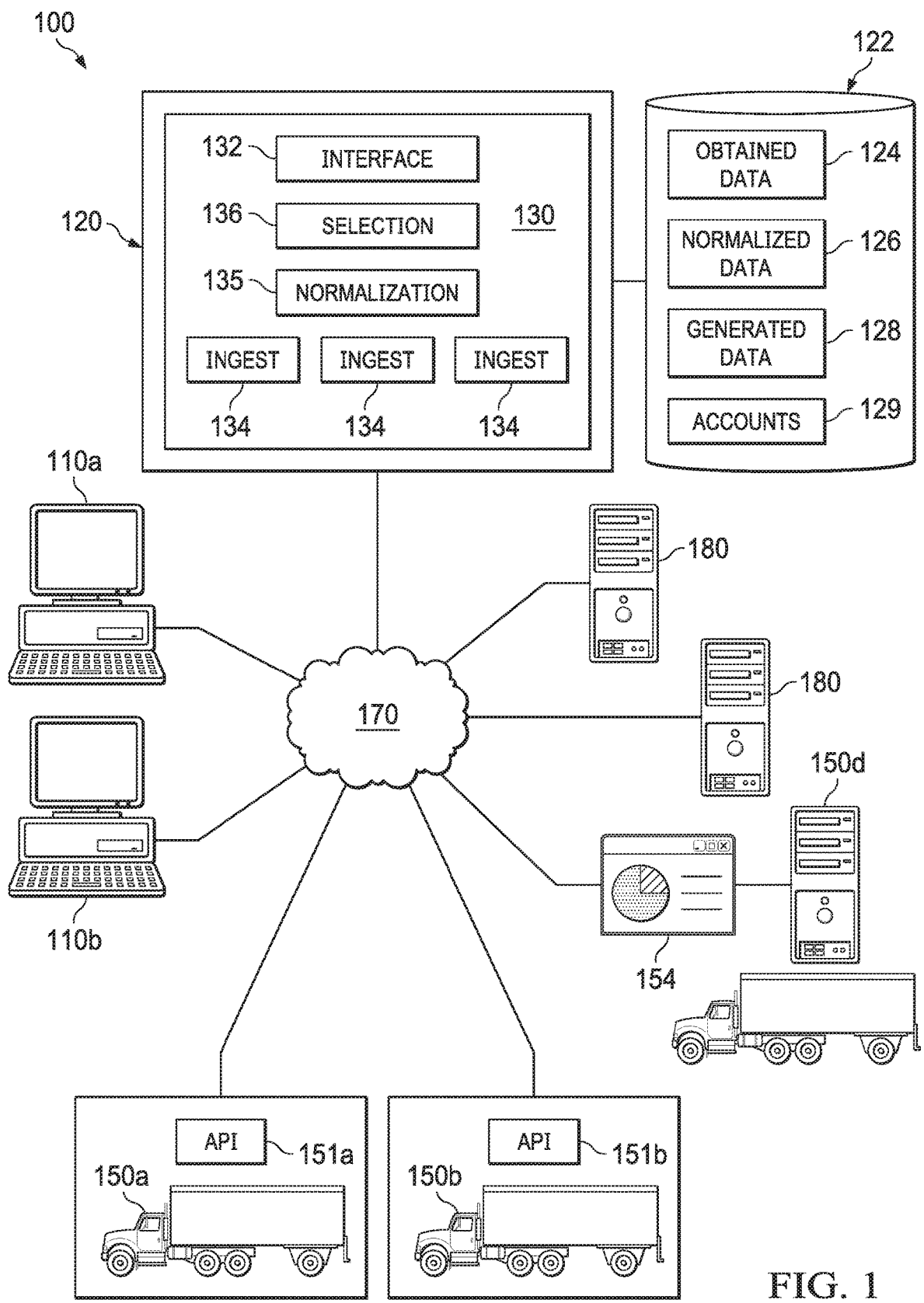
FIG. 1 depicts one embodiment of a topology which may be used with a shipping management system.

Embodiments of the systems and methods of the present invention may be better explained with reference to FIG. 1 which depicts one embodiment of a topology 100 which may be used to implement embodiments of the systems and methods of the present invention. Topology 100 comprises a set of entities including a shipping management system 120 that is coupled through network 170 to computing devices 110 (e.g. desktop computers, laptop computers, servers, smart phones), and one or more computer systems 150 ("carrier systems") at multiple carriers. Carriers may include national, international and regional carriers (e.g., UPS FREIGHT, SAIA, R+L CARRIERS, ABF, FED EX, DHL). Shipping management system 120 may also connect to various other external systems 180, such as e-commerce servers, ERP systems, TMS systems, ESP/SMS systems, CSR/CRM systems. Network 170 may be for example, a wireless or wireline communication network such as the Internet or wide area network (WAN), publicly switched telephone network (PTSN) or any other type of electronic communication link.

Shipping management system 120 may comprise one or more computer systems with central processing units executing instructions embodied on one or more computer readable media where the instructions are configured to perform at least some of the functionality associated with embodiments of the present invention. These applications may include a shipping management application 130 comprising one or more applications (instructions embodied on a computer readable media) configured to implement an interface module 132, data ingest modules 134, a normalization module 135, selection module 136 utilized by the shipping management system 120.

Furthermore, shipping management system 120 may include data store 122 operable to store obtained data 124, normalized data 126, generated data 128, account information 129 and other data. Account information 129 includes information on account holders of accounts with shipping management system 120. The account information may be associated with individuals, shippers or entities, such as retailers, that use drop shippers, where the drop shippers may or may not be account holders. The account holder information 129 may include credentials for one or more carrier systems 150 so that shipping management system 120 may log into a carrier system 150 on behalf of the account holder to schedule a shipment, request tracking information, etc.

Shipping management system 120 may provide a wide degree of functionality including utilizing one or more interfaces 132 configured to for example, to receive and respond to queries from users at computing devices 110. It will be understood that the particular interface 132 utilized in a given context may depend on the functionality being implemented by shipping management system 120, the type of network 170 utilized to communicate with any particular entity, the type of data to be obtained or presented, the time interval at which data is obtained from the entities, the types of systems utilized at the various entities, etc. In some embodiments, these interfaces may include, for example web pages, web services or application programming interfaces (APIs). In particular, in some embodiments, shipping management system 120 can provide an API so that online ordering systems may be integrated with shipping management system 120. Shipping management system 120 may select a carrier and schedule pick up of a shipment as part of a customer checkout process on an online ordering system.

Shipping management system 120 can interact with carrier systems 150 to execute shipments, collect tracking information, or take other actions. According to one embodiment, shipping management system 120 may provide an interface 132 through which a user can define a shipment. The shipment information may include an account holder if different than the shipper (e.g., a drop shipper can indicate (or it may be implicit) that the shipment is on behalf of a particular retailer), recipient, from address (shipper), to address (consignee), weight, product class and dimensions and other information. Shipping management system 120 can apply defined rules to multiple real time and historical signals to decision carrier selection. Shipping management system 120 may provide carrier selections to the user so that the user may select a final shipper or shipping management system 120 may automatically select the carrier. Shipping management system may then interact with the carrier system 150 for the selected carrier to execute the shipment.

In one embodiment, shipping management system applies rules to a combination of:
transportation signals, such as cost for a specific item (specific weight, origin, destination), current conditions;
historical signals such as carrier performance, both overall and area-specific;
business signals such as desired carrier mix or spend threshold. Business signals may include recipient value signals such as lifetime value or a specific purchase value.

In support of carrier selection, transportation signal data is collected as part of creating shipments. A transportation signal typically includes parameters necessary to order shipping, including information such as the shipment origin and destination, items (dimensions, weight and quantity). Other transportation signal data may include shipment preferences entered by the user. For example, the user may indicate that the shipping management system 120 should prioritize transit time, historical on-time delivery or other selection criteria when selecting a carrier. The transportation signals may further include a rate quote from the carrier specific to the shipment.

The transportation signal data from client computers 110 is collected by the interface module 132, can transmit that information to the further system through a normalized API. Ingest modules 134 can collect transportation signal data from the carriers. The transportation signal data may be stored in data 122 and may be normalized.

When a user defines a shipment, shipping management system 120 creates and sends a "shipment data packet" in real time to carrier candidates. The shipment data packet may include parameters such as from address (shipper), to address (consignee), dimensions, weight and quantity, mode, product class or other information used by the carrier to provide a cost to ship and estimated transit time.

In some cases, carrier systems 150 may provide public APIs 151 that allow external systems to execute shipments and access tracking data. An ingest module can be configured to interact with APIs 151 to submit the shipment data packet to various carriers and store the responses.

Other carrier systems 150 may only provide a web page interface, such as web page interface 154, for requesting and tracking shipments. However, since the structure of web pages can be understood through observation, an ingest module 134 may be programmed to submit information through a web page and collect the returned data.

Normalization module 135 can normalize the cost, estimated transit time and other data returned by carrier systems 150.

During shipment, carrier systems 150 may provide shipment tracking data that indicates when a shipment was ready for pickup, when the shipment was picked up, check in/check out at various tracking locations, when the shipment was actually delivered. Each tracking update can contain one or more of status (status code or other description), location and time information for a shipment. In some cases, a tracking data may indicate an exception. Exceptions are events that delay or otherwise adversely affect a shipment. Exception data may include for example, data that may indicate that a pickup was missed, a shipment was delivered late, a shipment was damaged, etc.

Shipment tracking data (and other data) can be normalized. In one embodiment, shipping management system 120 defines a status mapping document (e.g., in JavaScript Object Notation (JSON) format or other format) which defines:
  An input status code and/or status description.
  A matching rule, which is either "matches exactly", "starts with" or "ends with", that is applied to the input status code or status description. In some embodiments, applying matching rules may include parsing carrier provided transit data for specific codes or descriptive words (e.g., "arrived").
  A resulting normalized status code, exception flag and exception category for each matching input.

By defining a carrier-specific status mapping, normalization module 135 allows shipping management system 120 to compensate for differences between carriers using more or less specific rules based on the granularity for the source data.

Ingest modules 134 can collect tracking data from carrier systems 150 and normalization module 135 can normalize the data from the various carriers.

The historical signal data, including historical transportation signal data, historical shipment tracking data and other historical data can be persistently stored in data store 122. The historical signal data can include data on all executed and ingested shipments, as well as all tracking updates which pertain to each shipment. The historical signal data may be fully normalized.

Historical data for shipments may also be augmented by users. For example, even if a carrier-provided data does not indicate that a shipment was damaged, the user associated with the shipment may provide such information through an interface.

Shipping management system 120 can thus collect data on actual transit times by carrier and mode from origin (address or postal code) to destination (address or postal code) for shipments of various sizes, weights, etc. along with the estimated transit times for the prior shipments, exceptions that occurred and other information about shipments.

Selection module 136 may process historical signal data to generate one or more metrics for a carrier/mode. Examples include, but are not limited to, average transit time (ATT) from an origin to destination, on time percentage (OTP), delivery before exception percentage (DBE) (deliveries that were delivered without an exception prior to achieving a "delivered" status), average length of haul (LOH), average cost per pound per mile (cost/lb/mi), number of in transit shipments. DBE may account for all types of exceptions or only certain types of exceptions and there may be different DBEs for different types of exceptions (e.g., damage exception vs. delay exception).

One or more of the historical metrics may account for source/destination, time of year, package size class, package weight class or other factors. In some cases, some historical shipping metrics may be calculated based on all past shipments or all shipments in a time window, while other historical shipping metrics account for source/destination, time of year, package size class, package weight class or other factors. For example, in one embodiment, OTP may be calculated in aggregate for a carrier/mode, while average transit time is determined on a per origin/destination pair basis.

FIG. 2 is a diagrammatic representation of one embodiment of a scorecard illustrating various metrics for carriers/modes. In the example of FIG. 2, five carriers are shown (Carrier 1, Carrier 2, Carrier 3, Carrier 4, and Carrier 5). For each carrier, the scorecard shows mode, OTP, DBE, LOH, Cost, and number of in transit shipments.

Returning to FIG. 1, shipping management system 120 may also receive business signals, from a shipper such as desired carrier mix or spend threshold. Business signals may include recipient value signals such as lifetime value or a specific purchase value. Recipient value signals can include information regarding the value of a recipient to an account holder. This information may be provided by the account holder as a classification (e.g., a user may label particular recipients as "Tier 1", "Tier 2" etc.). In other cases, selection module 136 may apply rules to shipping data to determine recipient value. The "Tier 1" recipients of a shipper (or account holder) may be, for example, a recipient that receives x number of shipments a month from an account holder, or greater than a particular percentage of an account holder's shipments, or is in the top y recipients for the account holder. Customer tier classifications may be updated as new information becomes available or according to a schedule.

Selection module 136 may score carriers/modes based on one or more factors from historical data, current transportation signal data and business signal data. According to one embodiment, for example, when a user enters shipment information, selection module 136 may apply a scoring algorithm to score carriers/modes based on one or more factors from the historical data, such as ATT for the origin/destination postal codes, OTP, DBE, cost/lb/mi and other factors. The factors may be weighted where the weights are tunable based user (e.g., account holder) preferences. If the shipper indicates that speed and on time delivery are more important for a shipment, the scoring algorithm may weight ATT and OTP more heavily than cost/lb/mi. On the other hand, if cost is a higher priority, a scoring algorithm that weights cost more heavily may be selected.

In the above example, historical cost/lb/mi is used, and thus a score that accounts for price can be calculated prior to receiving a quote from a carrier for a particular shipment. In another embodiment, shipping management system 120 can send the shipment packet to the carrier systems 150, receive quotes in return and include data from the returned quote, such as price, estimated delivery time, in the shipping algorithm.

The carriers presented to the shipper for selection can be based on the scoring. For example, when a shipper wishes to select a carrier for a particular shipment, the shipper may be shown the carriers in rank-order based on the scoring. In some embodiments, the shipper's selection of carrier is limited to the top "n" carrier(s) based on the scoring.

While in the previous examples, selection module 136 was described in terms of using a weighted selection scoring algorithm to score carriers, selection module 136 may use other rules. In one embodiment, minimum criteria for one or more performance metrics may be set by default or by the shipper and the selection module 136 can select from the carriers that meet those criteria based on selection rules. For example, the shipper may specify a minimum OTP of 85%. When the shipper initiates a new shipment, shipping management system 120 can, for example, select the lowest cost carrier from the carriers that have an OTP of 85% or greater. Using the data of FIG. 2, the shipping management system 120 could select the lowest cost carrier between Carrier 3 and Carrier 5 because these are the only carriers with an OTP>85%.

According to one embodiment, selection module 136 may take into account recipient value signal data when scoring carriers. For example, in one embodiment, the account holder may specify that on time delivery is most important for Tier 1 recipients, but, for other recipients, cost (historical or quoted) and on time delivery are equally important. In this case, OTP would be weighted most heavily for Tier 1 recipients, whereas OTP and cost could be weighted equally for non-Tier 1 recipients. As another example, the shipper may specify rules such as:

Tier 1: OTP>85%, DBE>75%, selection criteria=ATT;
Tier 2: OTP>85%, DBE>50%, selection criteria=cost;
Tier 3: selection criteria=cost.

Again using FIG. 2 and the example rules above: i) for a shipment to a Tier 1 recipient, selection module 136 would select Carrier 3 based on OPT and DBE; ii) for a shipment to a Tier 2 recipient, selection module 136 would select either Carrier 3 or Carrier 5 based on which had the lowest cost for the origin/destination of the shipment (or would present Carrier 3 and Carrier 5 in rank order based on cost for selection by the shipper); and iii) for a shipment to a Tier 3 recipient, the selection module 136 would simply select the lowest cost carrier or rank the carriers based on lowest cost.

It can be noted that one or more performance metrics, weighted performance metrics, scores (including rankings) used or produced by the scoring rules may be pre-calculated in that they may be current based on the latest shipping data from prior shipments that has been processed (e.g., as that information came in or according to a schedule) but are not calculated in response to a new shipping request. This can make the system more efficient and responsive as the system does not have to calculate the pre-calculated item for every new shipping request at the time that request is being made. In other embodiments, one or more of the metrics, weighted metrics or scores used or produced by the scoring algorithm may be calculated at the time the shipment is requested.

In operation, shipping management system 120 may provide a system through which shippers can select carriers, schedule pick up of shipments and track shipments. In one embodiment, when an account holder requests a shipment on behalf of itself, shipping management system 120 may provide the account holder with a choice of carriers to ship any particular shipment based on selection rules (e.g., the top three carriers) whereas when another shipper requests a shipment on behalf of an account holder, (e.g., a drop shipper requests a shipment), shipping management system 120 may enforce the account holder's policies and automatically select a carrier for the shipment. In any event, when a carrier is selected by user selection or automatically, shipping management system 120 can communicate with carrier system 150 through the API 151 to execute the shipment.

Figure 3:
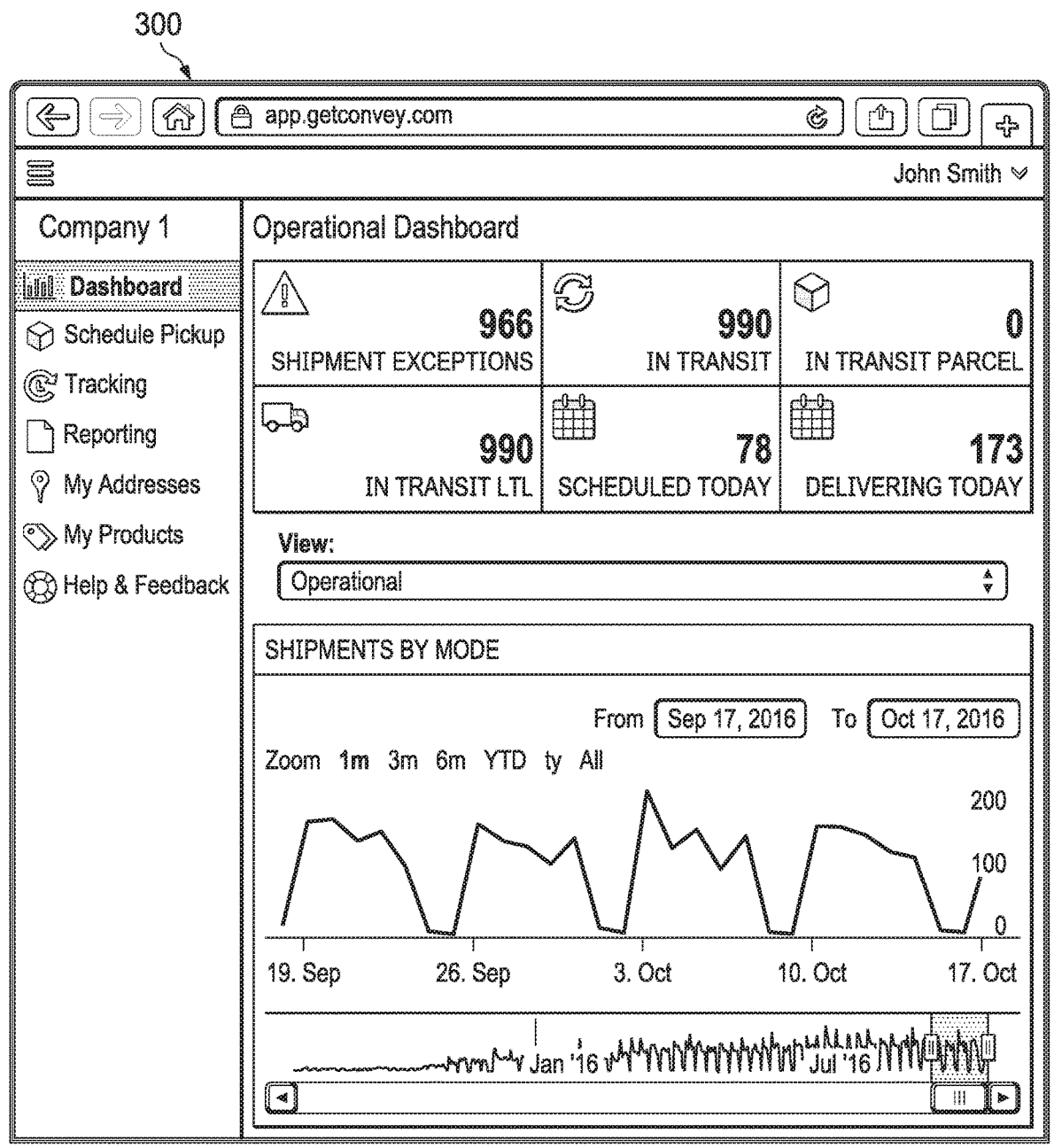
FIG. 3 depicts a dashboard provided by a shipping management system.

FIG. 3 illustrates an embodiment of a dashboard provided by shipping management system 120 (e.g., a web based dashboard generated by interface module 132) to a user ("John Smith") associated with an account holder ("Company 1"). From the dashboard, the user can view various metrics and access functions of shipping system 120. For example, the user can view shipment exceptions, view tracking information, etc. In particular, the user can schedule a new shipment (by selecting the menu item indicated at 300).

When a user selects to schedule a new shipment using the system, a new shipment page is displayed (FIG. 4). With respect to FIG. 4, for example, the user provides shipment information to schedule pickup of a new shipment. Note that the shipper may be able to specify the shipper role (e.g., shipper, drop shipper, etc.). Although not shown, the shipper can add additional information such as dimensions, weight or information needed to generate a shipment packet. In response to receiving the shipment information from the shipper and potentially quotes from multiple carriers, shipping management system 120 can provide a list of potential carriers based on the information and selection rules.

FIG. 5, for example, illustrates a dynamically generated web page in which carriers are presented to the user. In the example of FIG. 5, five carriers are shown, along with several pieces of information. In this example, for each carrier, information is shown relating to liability, transit days, an estimated delivery date, and a net cost. In this example, one of the five carriers (Carrier 5) is shown, but the system is unable to show any information, due to the condition described.

In one embodiment, the carriers are presented in rank order based on selection module 136 scoring the carriers on historical shipping data, recipient value data or other data as discussed above. The carriers displayed may be the top "n" carriers based on the scoring algorithm, the carriers achieving a designated minimum score or carriers selected based on other criteria. The carrier(s) presented to a drop shipper may be presented based on a scoring algorithm selected by the retailer/manufacturer etc. for which the drop shipper is shipping.

Figure 6:
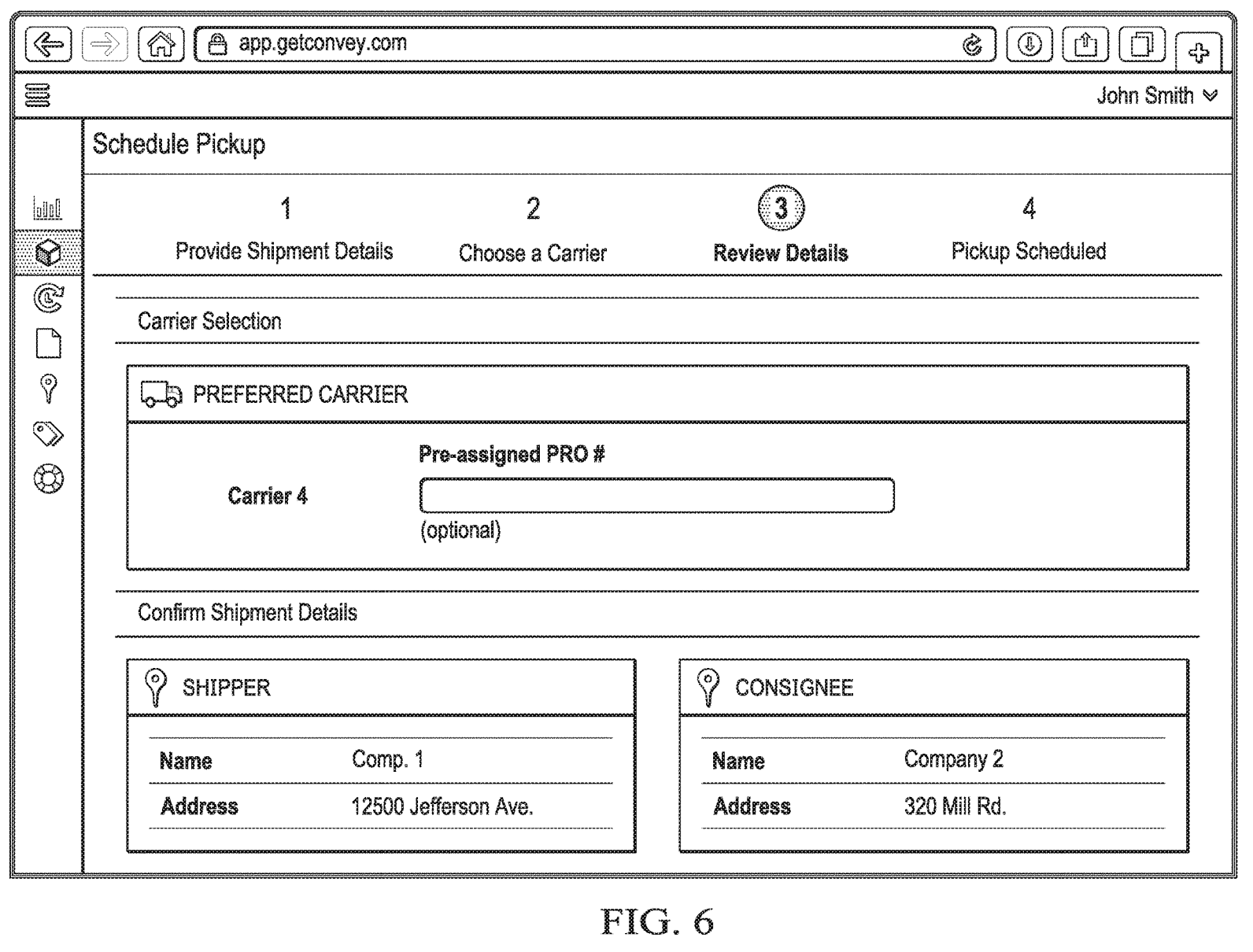

FIG. 5 also shows a "SELECT" button for four of the carriers. In this example, the shipper can then select a carrier (e.g., by clicking on the "SELECT" link) and schedule a pick up. In another embodiment, the top carrier is automatically selected by selection module 136 based on the scoring algorithm. FIG. 6 illustrates a web page in which the user can review the shipping order and finalize the order for shipment by the carrier that the user selected or that was automatically selected.

A user may also be able to access other information through the dashboard. For example, a user may be able to view the status of all shipments associated with that shipper. For example, FIG. 7 is a web page view showing a list of shipments, including a "Status" column, which shows the status of each shipment. In this embodiment, individual shipments are presented with various visual indicators (icons, colors, etc.) to indicate the status of each shipment. The user can select a particular shipment by clicking on the shipment to drill down into the details of the shipment (FIG. 8). In the example of FIG. 8, the user can view information such as the ship date, the origin, the destination, the estimated delivery, carrier exceptions, and the shipping history.

Embodiments of a hardware architecture for implementing certain embodiments is described herein. One embodiment can include one or more computers communicatively coupled to a network. As is known to those skilled in the art, the computer can include a central processing unit ("CPU"), at least one read-only memory ("ROM"), at least one random access memory ("RAM"), at least one hard drive ("HD"), and one or more input/output ("I/O") device(s). The I/O devices can include a keyboard, monitor, printer, electronic pointing device (such as a mouse, trackball, stylus, etc.), or the like. In various embodiments, the computer has access to at least one database over the network.

ROM, RAM, and HD are computer memories for storing computer instructions executable (in other words, which can be directly executed or made executable by, for example, compilation, translation, etc.) by the CPU. Within this disclosure, the term "computer-readable medium" is not limited to ROM, RAM, and HD and can include any type of data storage medium that can be read by a processor. In some embodiments, a computer-readable medium may refer to a data cartridge, a data backup magnetic tape, a floppy diskette, a flash memory drive, an optical data storage drive, a CD-ROM, ROM, RAM, HD, or the like.

At least portions of the functionalities or processes described herein can be implemented in suitable computer-executable instructions. The computer-executable instructions may be stored as software code components or modules on one or more computer readable media (such as non-volatile memories, volatile memories, DASD arrays, magnetic tapes, floppy diskettes, hard drives, optical storage devices, etc. or any other appropriate computer-readable medium or storage device). In one embodiment, the computer-executable instructions may include lines of compiled C++, Java, HTML, or any other programming or scripting code.

Additionally, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

As used herein, the terms "comprises," "comprising," "includes," "including," "has," "having" or any other variation thereof, are intended to cover a non-exclusive inclusion. For example, a process, article, or apparatus that comprises a list of elements is not necessarily limited only those elements but may include other elements not expressly listed or inherent to such process, article, or apparatus. Further, unless expressly stated to the contrary, "or" refers to an inclusive or and not to an exclusive or. For example, a condition "A or B" is satisfied by any one of the following: A is true (or present) and B is false (or not present), A is false (or not present) and B is true (or present), and both A and B are true (or present).

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example," "for instance," "e.g.," "in one embodiment."

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

What is claimed is:

1. A system for facilitating dynamic carrier selection comprising:
   a shipping management computer system;
   a data storage device coupled to the shipping management computer system the data storage device storing:
      historical signal data for a plurality of shipments transported by a plurality of carriers, the historical signal data comprising historical transportation signal data collected from orders made through the shipping management computer system and historical electronic shipment tracking data ingested by the shipping management computer system from a plurality of carrier computer systems which are connected to the shipping management computer system by a network, each of the plurality of carrier computer systems associated with a respective carrier of the plurality of carriers;
      a set of selection preferences associated with a shipper, each selection preference in the set of selection preferences corresponding to a respective recipient tier from a plurality of recipient tiers;
   and wherein the shipping management computer system is configured to:
      provide a user interface to a client computer to allow a user to submit online via the network a new electronic shipment order for a new shipment, the new shipment order including an origin, a destination, a recipient, and physical parameters of the new shipment;
      responsive to receiving the new shipment order using the user interface, generate an electronic order packet and interact with the plurality of carrier computer systems over the network to submit the electronic order packet to the plurality of carrier computer systems;
      receive via the network shipping information responsive to the electronic order packet from each of the plurality of carrier computer systems, wherein the shipping information from each of the plurality of carrier computer systems has a carrier specific format used by the respective carrier;

normalize the shipping information using a matching rule, wherein the matching rule matches a portion of at least one of an input status code or an input status description from the plurality of carrier computer systems to a corresponding normalized status code or a corresponding normalized status description to normalize the carrier specific format to a common format for the new shipment;

determine one or more metrics for the plurality of carriers based on the historical signal data;

score the plurality of carriers using a plurality of factors to generate a set of carrier scores for the new shipment, the plurality of factors comprising the one or more metrics and at least one factor from the normalized shipping information for the new shipment, the plurality of factors weighted according to a first selection preference selected based on a determination that the recipient belongs to a first tier from the plurality of recipient tiers;

select one or more of the plurality of carriers based on the set of carrier scores;

generate a user interface display;

present, in the user interface display using the user interface, the selected one or more of the plurality of carriers to the user;

and execute, by the shipping management computer system, the new shipment based on a first carrier chosen from among the selected one more of the plurality of carriers, wherein executing the new shipment comprises interacting with the carrier computer system associated with the first carrier to signal to the carrier computer system associated with the first carrier to execute the new shipment.

2. The system of claim 1, wherein the shipping management computer system is configured to provide a carrier selection interface to the client computer, the carrier selection interface configured to display the selected one or more of the plurality of carriers, wherein the first carrier is chosen by the user via the carrier selection interface.

3. The system of claim 1, wherein the first carrier is automatically chosen by the shipping management computer system based on a selection criteria specified in the first selection preference.

4. The system of claim 3, wherein the first carrier is automatically chosen by the shipping management computer system based on an estimated cost of the new shipment and at least one additional factor.

5. The system of claim 1, wherein the plurality of factors comprises an average transit time from the origin to the destination.

6. The system of claim 1, wherein the plurality of factors includes cost.

7. The system of claim 1, wherein the plurality of factors includes reliability.

8. A method for dynamic carrier selection comprising:
storing at a shipping management system:
historical signal data for a plurality of shipments transported by a plurality of carriers, the historical signal data comprising historical transportation signal data collected from online orders made through the shipping management system and historical electronic shipment tracking data ingested by the shipping management system from a plurality of carrier computer systems which are connected to the shipping management computer system by a network, each of the plurality of carrier computer systems associated with a respective carrier of the plurality of carriers;

and a set of selection preferences associated with a shipper, each selection preference in the set of selection preferences corresponding to a respective recipient tier from a plurality of recipient tiers;

providing a user interface for the shipping management system to a client computer to allow a user to submit online via the network a new electronic shipment order for a new shipment, the new shipment order including an origin, a destination, a recipient, and physical parameters of the new shipment;

responsive to the user submitting the new electronic shipment order using the user interface, generating an electronic order packet at the shipping management system and interacting, by the shipping management system, with the plurality of carrier computer systems over the network to submit the electronic order packet to the plurality of carrier computer systems;

receiving, at the shipping management system via the network, shipping information responsive to the electronic order packet from each of the plurality of carrier computer systems, wherein the shipping information from each of the plurality of carrier computer systems has a carrier specific format used by the respective carrier;

normalizing, by the shipping management system, the shipping information using a matching rule, wherein the matching rule matches a portion of at least one of an input status code or an input status description from the plurality of carrier computer systems to a corresponding normalized status code or a corresponding normalized status description to normalize the carrier specific format to a common format for the new shipment;

determining, by the shipping management system, one or more metrics for the plurality of carriers based on the historical signal data;

scoring, by the shipping management system, the plurality of carriers using a plurality of factors to generate a set of carrier scores for the new shipment, the plurality of factors comprising the one or more metrics and at least one factor from the normalized shipping information for the new shipment, the plurality of factors weighted according to a first selection preference selected based on a determination that the recipient belongs to a first tier from the plurality of recipient tiers;

selecting, by the shipping management system, one or more of the plurality of carriers based on the set of carrier scores;

generating a user interface display;

presenting, in the user interface display by the shipping management system, the selected one or more of the plurality of carriers to the user using the user interface;

and executing, by the shipping management system, the new shipment based on a first carrier chosen from among the selected one more of the plurality of carriers, wherein executing the new shipment comprises interacting with the carrier computer system associated with the first carrier to signal to the carrier computer system associated with the first carrier to execute the new shipment.

9. The method of claim 8, wherein the shipping management system is configured to provide a carrier selection interface to the client computer, the carrier selection interface configured to display the selected one or more of the plurality of carriers, wherein the first earlier is Chosen by the user via the carrier selection interface.

10. The method of claim 8, wherein the first carrier is automatically chosen by the shipping management system based on a selection criteria, specified in the first selection preference.

11. The method of claim 10, wherein the first carrier is automatically chosen by the shipping management system based on an estimated cost of the new shipment and at least one additional factor.

12. The method of claim 8, wherein the plurality of factors comprises an average transit time from the origin to the destination.

13. The method of claim 8, wherein the plurality of factors includes cost.

14. The method of claim 8, wherein the plurality of factors includes reliability.

15. A computer program product comprising a non-transitory computer readable medium storing a set of computer executable instructions, the computer executable instructions executable to perform a method comprising:
    storing at a shipping management system:
        historical signal data for a plurality of shipments transported by a plurality of carriers, the historical signal data comprising historical transportation signal data collected from online orders made through the shipping management system and historical electronic shipment tracking data ingested by the shipping management system from a plurality of carrier computer systems which are connected to the shipping management computer system by a network, each of the plurality of carrier computer systems associated with a respective carrier of the plurality of carriers;
        and a set of selection preferences associated with a shipper, each selection preference in the set of selection preferences corresponding to a respective recipient tier from a plurality of recipient tiers;
    providing a user interface for the shipping management system to a client computer to allow a user to submit online via the network a new electronic shipment order for a new shipment, the new shipment order including an origin, a destination, a recipient, and physical parameters of the new shipment;
    responsive to the user submitting the new shipment order using the user interface, generating an electronic order packet at the shipping management system and interacting, by the shipping management system, with the plurality of carrier computer systems over the network to submit the electronic order packet to the plurality of carrier computer systems;
    receiving, via the network at the shipping management system, shipping information responsive to the electronic order packet from each of the plurality of carrier computer systems, wherein the shipping information from each of the plurality of carrier computer systems has a carrier specific format used by the respective carrier;
    normalizing, by the shipping management system, the shipping information using a matching rule, wherein the matching rule matches a portion of at least one of an input status code or an input status description from the plurality of carrier computer systems to a corresponding normalized status code or a corresponding normalized status description to normalize the carrier specific format to a common format for the new shipment;
    determining, by the shipping management system, one or more metrics for the plurality of carriers based on the historical signal data;
    scoring, by the shipping management system, the plurality of carriers using a plurality of factors to generate a set of carrier scores for the new shipment, the plurality of factors comprising the one or more metrics and at least one factor from the normalized shipping information for the new shipment, the plurality of factors weighted according to a first selection preference selected based on a determination that the recipient belongs to a first tier from the plurality of recipient tiers;
    selecting, by the shipping management system, one or more of the plurality of carriers based on the set of carrier scores;
    generating a user interface display;
    presenting, in the user interface display by the shipping management system, the selected one or more of the plurality of carriers to the user using the user interface;
    and executing, by the shipping management system, the new shipment based on a first carrier chosen from among the selected one more of the plurality of carriers, wherein executing the new shipment comprises interacting with the carrier computer system associated with the first carrier to signal to the carrier computer system associated with the first carrier to execute the new shipment.

16. The computer program product of claim 15, further comprising instructions for providing a carrier selection interface to the client computer, the carrier selection interface configured to display the selected one or more of the plurality of carriers, wherein the first carrier is chosen by the user via the carrier selection interface.

17. The computer program product of claim 15, further comprising instructions for automatically choosing the first carrier based on a selection criteria specified in the first selection preference.

18. The computer program product of claim 17, wherein the selection criteria is an estimated cost.

19. The computer program product of claim 15, wherein the plurality of factors comprises an average transit time from the origin to the destination.

20. The computer program product of claim 15, wherein the plurality of factors includes cost.

* * * * *